United States Patent [19]
Derrick, Jr. et al.

[11] Patent Number: 5,221,008

[45] Date of Patent: Jun. 22, 1993

[54] VIBRATORY SCREENING MACHINE AND NON-CLOGGING WEAR-REDUCING SCREEN ASSEMBLY THEREFOR

[75] Inventors: H. William Derrick, Jr., Williamsville; John J. Bakula, Grand Island, both of N.Y.

[73] Assignee: Derrick Manufacturing Corporation, Buffalo, N.Y.

[21] Appl. No.: 758,339

[22] Filed: Aug. 28, 1991

Related U.S. Application Data

[63] Continuation of Ser. No. 522,166, May 11, 1990, abandoned.

[51] Int. Cl.$^5$ .................................................. B07B 1/28
[52] U.S. Cl. .................................. 209/269; 209/315; 209/319; 209/400; 209/403
[58] Field of Search ............... 209/255, 257, 268, 269, 209/311, 315, 319, 400, 401, 403; 210/335, 388, 389, 406

[56] References Cited

U.S. PATENT DOCUMENTS

| | | |
|---|---|---|
| 966,578 | 8/1910 | Murphy et al. |
| 1,716,758 | 12/1924 | Bland |
| 2,061,850 | 11/1936 | Roberts ........................ 210/76 |
| 2,638,220 | 5/1953 | Schneider .................... 209/269 |
| 2,723,032 | 11/1955 | Gisler et al. ................. 209/401 |
| 2,764,291 | 9/1956 | Vigeant ....................... 209/269 |
| 2,985,303 | 5/1961 | Wright ......................... 209/405 |
| 3,900,628 | 8/1975 | Stewart ........................ 428/134 |
| 3,935,109 | 1/1976 | Rundqvist et al. ......... 210/406 |
| 4,033,865 | 7/1977 | Derrick, Jr. ................. 209/275 |
| 4,446,022 | 5/1984 | Harry .......................... 210/388 |
| 4,575,421 | 3/1986 | Derrick et al. .............. 209/405 X |
| 4,696,751 | 9/1987 | Eifling ........................ 209/403 X |
| 4,848,607 | 7/1989 | Halley ......................... 209/319 |
| 4,861,461 | 8/1989 | Utterback ................... 209/257 X |

FOREIGN PATENT DOCUMENTS

| | | | |
|---|---|---|---|
| 98524 | 7/1961 | Netherlands | 209/401 |

Primary Examiner—Andres Kashnikow
Assistant Examiner—Joseph A. Kaufman
Attorney, Agent, or Firm—Joseph P. Gastel

[57] ABSTRACT

A vibratory screen for a vibratory screening machine consisting of a plate having a plurality of spaced openings therein, a coarse screen located in contiguous relationship to the plate, a fine screen on top of the coarse screen, a finer screen on top of the fine screen, and a topmost screen which is less fine than the finer screen and epoxy binding all of the foregoing screens to the plate at the borders of the openings. A vibratory screening machine having a tank for receiving a liquid-solid mixture, a plurality of screens of the foregoing type mounted to produce a sealed partition in the tank, an inlet conduit for supplying a liquid-solid mixture to the screens at a rate to maintain a head of the liquid-solid mixture above the screens, a vibratory motor attached to the tank to vibrate the tank, an outlet in the tank below the screens, and a liquid trap located at the outlet to thereby prevent air from entering the chamber in the tank below the screens and to draw a slight vacuum in the chamber. A screening machine assembly consisting of a first machine of the foregoing type at a higher elevation and a second machine of the foregoing type at a lower elevation for receiving a liquid-solid mixture from the trap of the first machine, the second machine also having a trap associated therewith which functions in the same manner as the trap of the first machine.

40 Claims, 6 Drawing Sheets

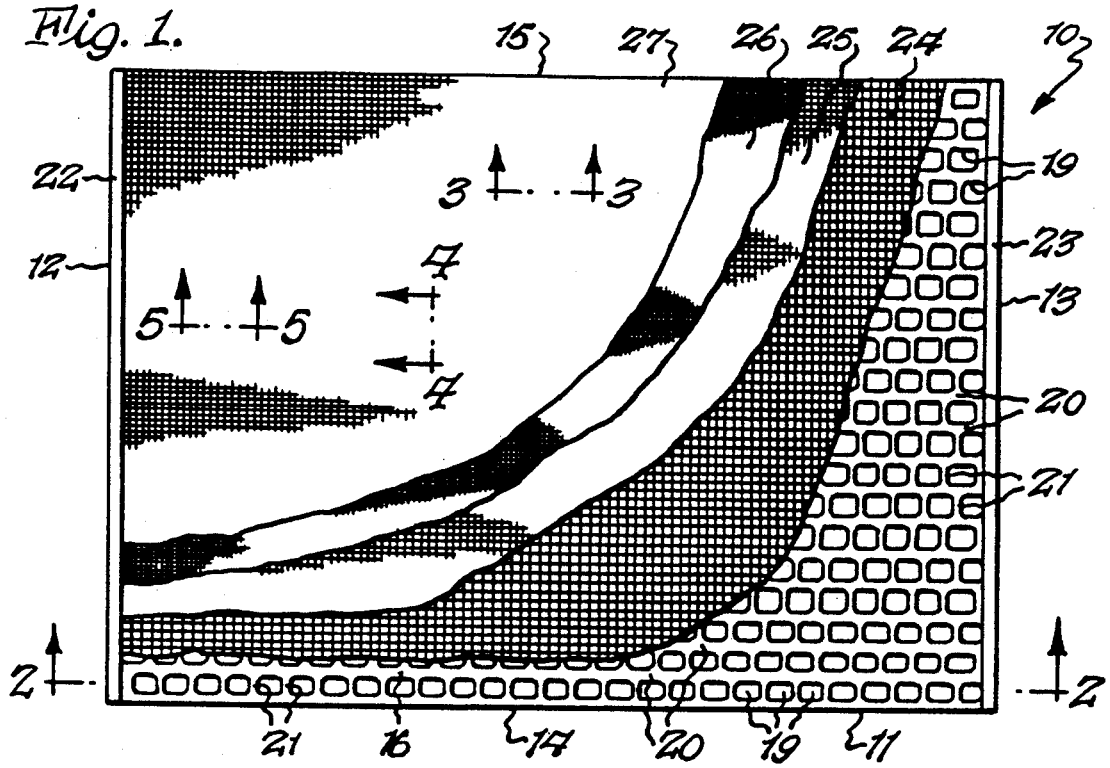
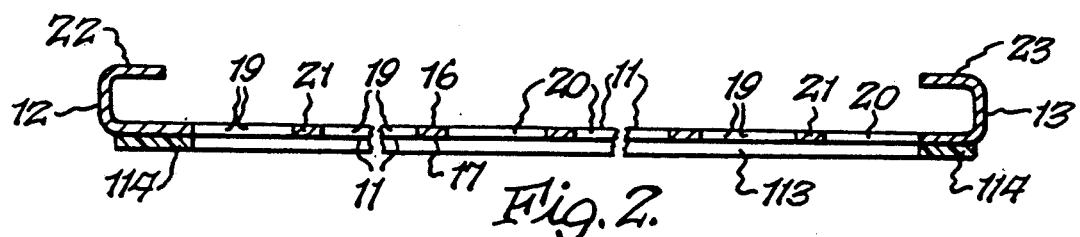
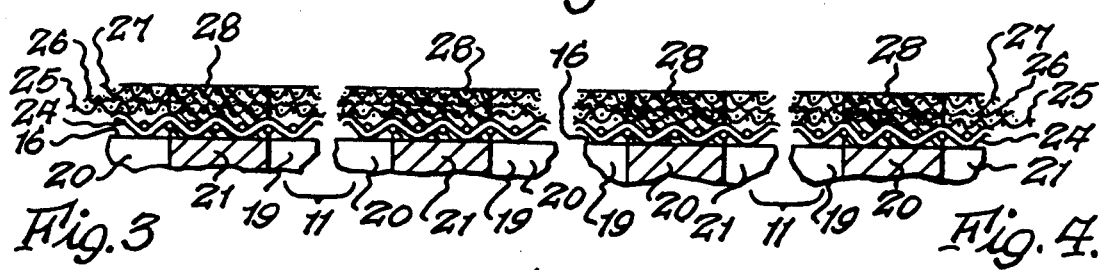
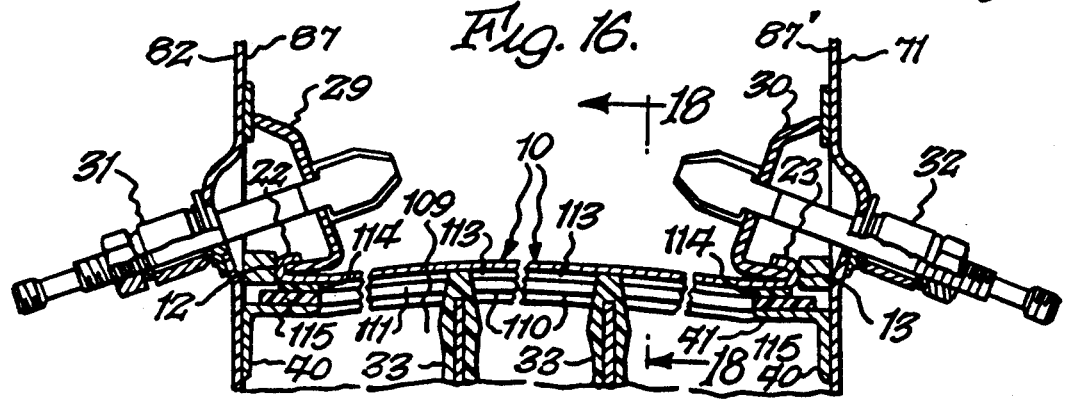

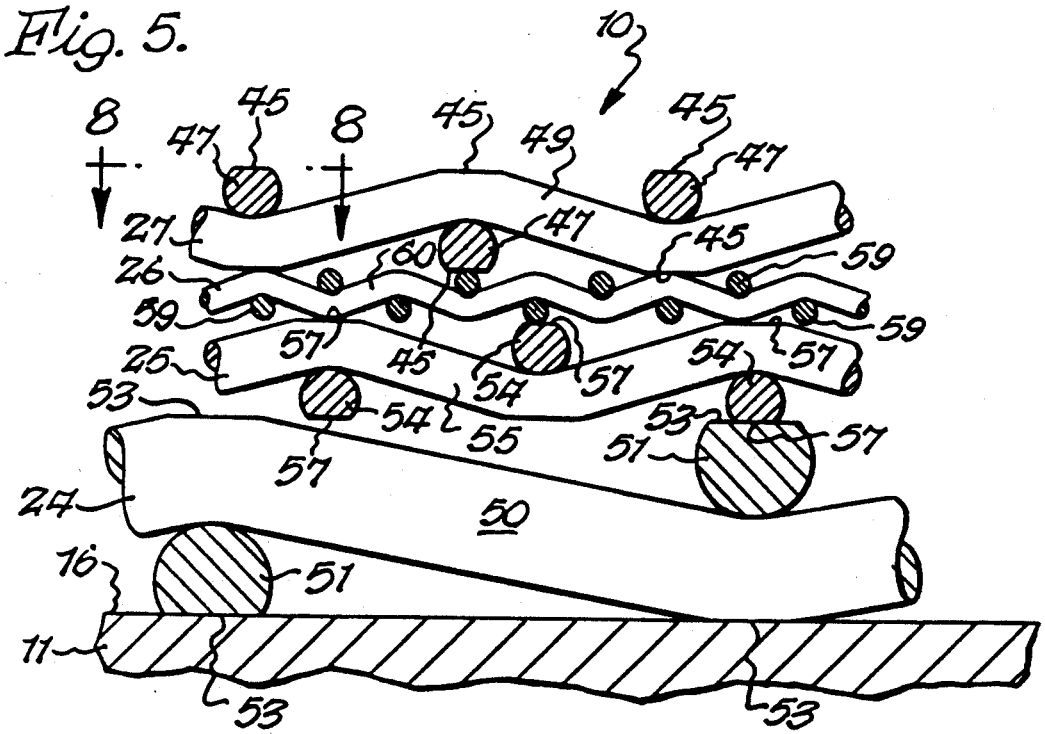
Fig. 5.
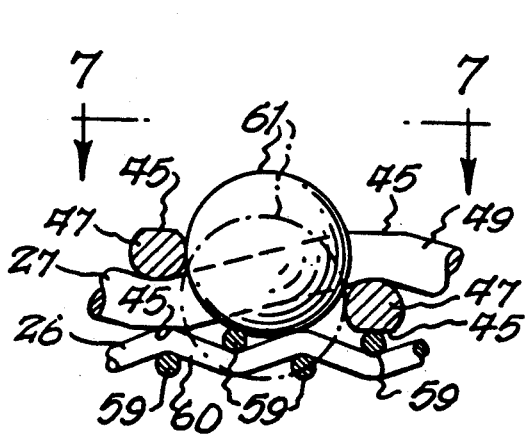
Fig. 6.
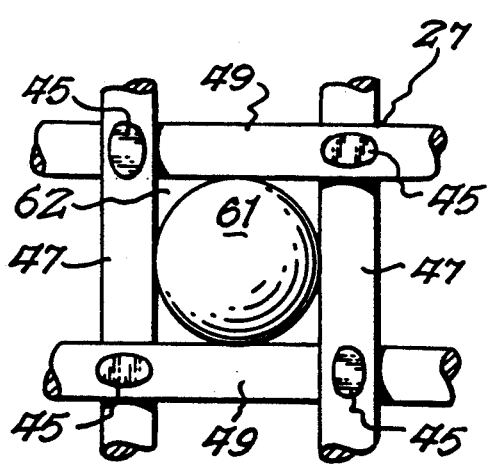
Fig. 7.
Fig. 8.

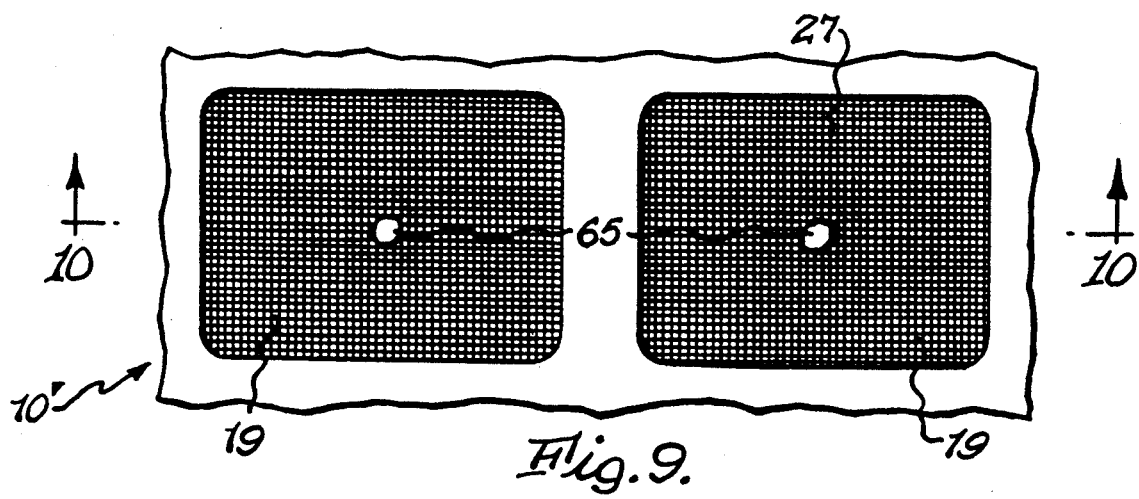
Fig. 9.
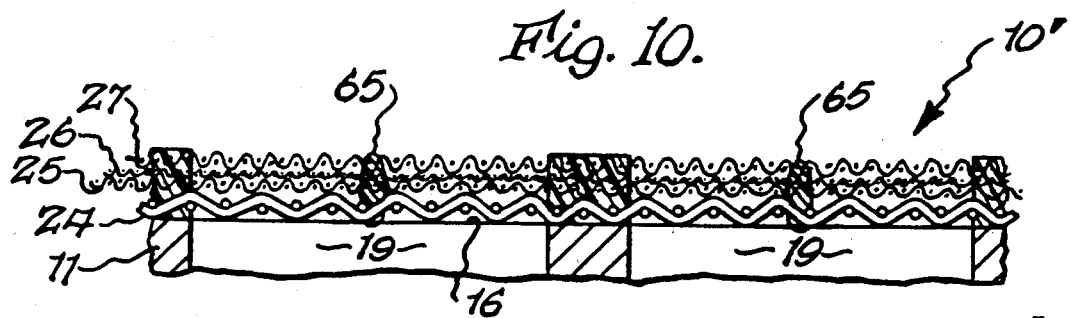
Fig. 10.
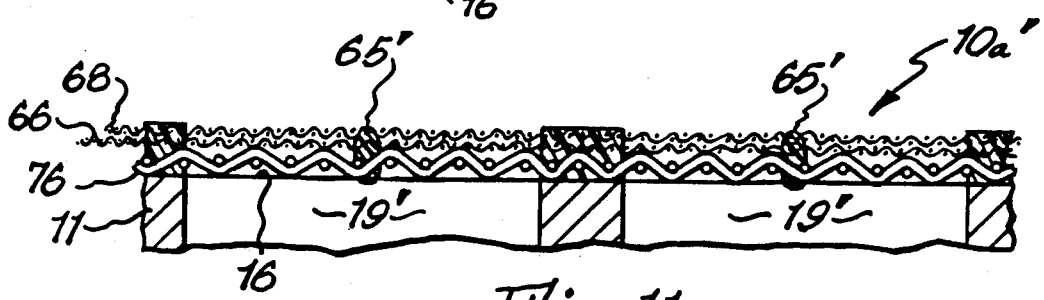
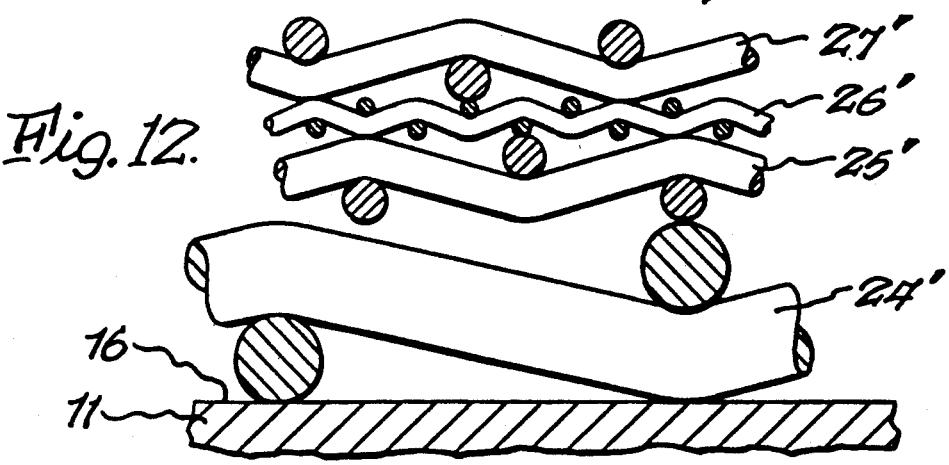
Fig. 11.
Fig. 12.

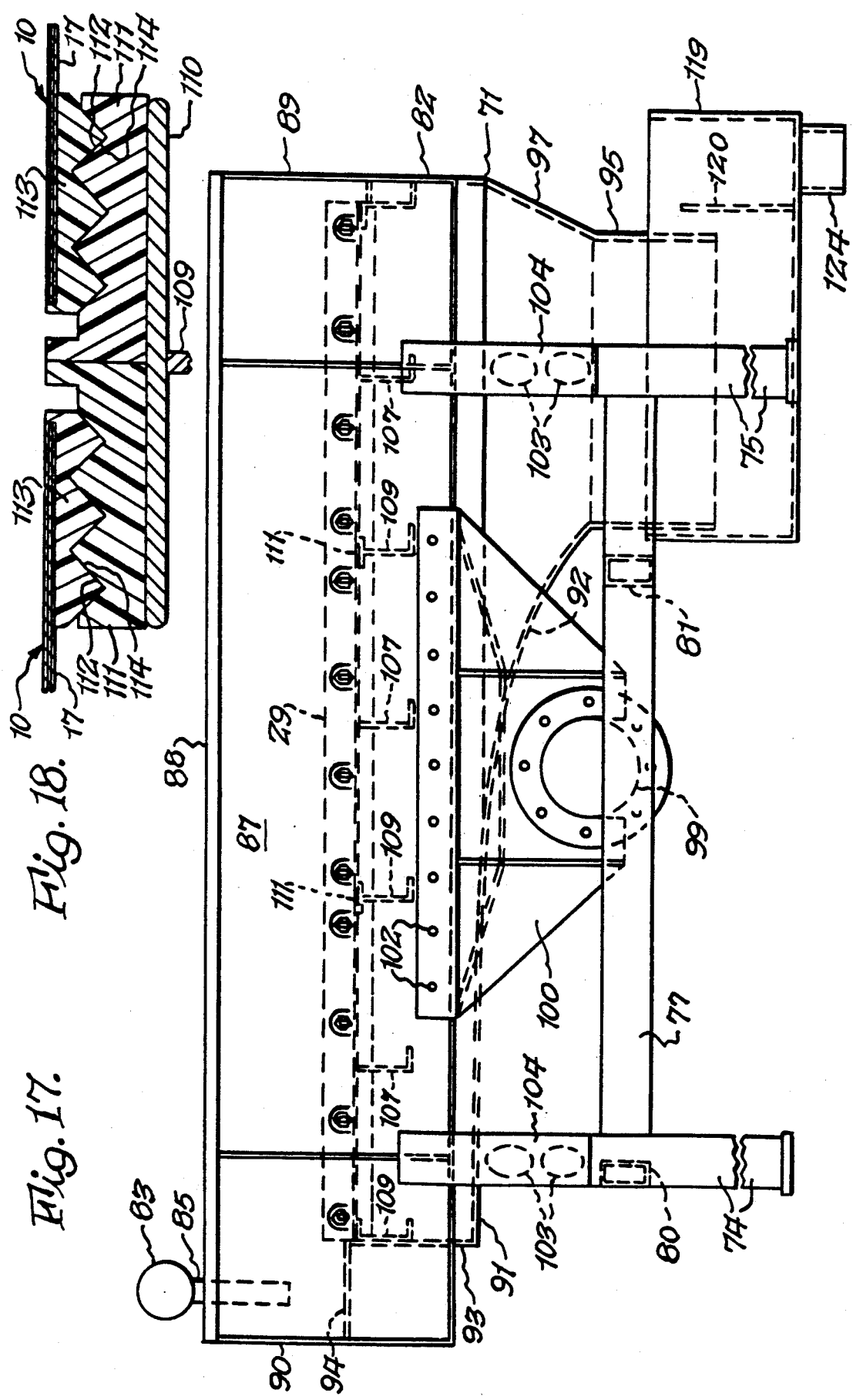

VIBRATORY SCREENING MACHINE AND NON-CLOGGING WEAR-REDUCING SCREEN ASSEMBLY THEREFOR

This application is a continuation of application Ser. No. 522,166, filed May 11, 1990 now abandoned.

BACKGROUND OF THE INVENTION

The present invention relates to an improved non-clogging and wear-reducing vibratory screen and to an improved vibratory screening machine in which it can be used.

By way of background, in U.S. Pat. No. 4,575,421 there is disclosed a non-clogging wear-reducing vibratory screen wherein a coarse screen and a plurality of fine screens are bonded to an apertured plate which is vibrated in a vibratory screening machine. In this patent, a fine screen is mounted on top of a coarse supporting screen and a finer screen is mounted on top of the fine screen. The three layers of screens are bonded to the plate at the borders of the apertures. The foregoing screen operated satisfactorily in screening dry materials and liquid-solid mixtures. It has been found that when vibratory screening is effected with screens of the foregoing type under a head of fluid, that is, under a height of a liquid-solid mixture, more rapid screening can be effected than if the screening is being effected without such a head. However, it has been found that when the more rapid screening is being effected under such a head, the vibratory screens wear out more rapidly because the flexing produces fatigue failure of the screens at the borders of the apertures and because the fragile uppermost screen is exposed to abrasion by relatively large particles in the liquid-solid mixture.

Relative to the machine aspect of the present invention, kaolin is processed at its point of manufacture for use as a coating in the paper industry. The kaolin is ground so that it will be of a 325 mesh size, which is a size which passes through a 370 mesh screen. However, at the termination of processing it is in a 50% water solution. It is then in condition to be shipped to the paper manufacturer in railroad tank cars. However, for the sake of economy it is desired that the kaolin content be increased to 70%, rather than 50%, so that a transportation charge is not paid for shipping water. Therefore, dry powdered kaolin is added to the 50% kaolin solution to bring its concentration up to 70%. However, incidental to this thickening procedure, it is possible that larger sizes of kaolin will enter the mixture. Such larger sizes cannot be tolerated in the paper manufacturing process.

In the past, the 70% solution was therefore treated on vibratory screening machines to screen out any larger particles before it was loaded into a tank car. Such machines were capable of producing approximately five gallons per minute of the screened 70% solution. This was a relatively slow rate, and therefore numerous screening machines were operated simultaneously to fill a tank car in a reasonably short period of time.

In addition to the foregoing, in the oil drilling industry drilling mud is utilized during drilling, and this mud is screened to remove undesired large particles of foreign materials so that the expensive drilling mud can be reused. When the mixture of drilling mud and water and undesired large particles were screened with screens of the general type disclosed in U.S. Pat. No. 4,575,421, (1) the undesired large particles abraded the finest uppermost screen and thus produced tears therein after a relatively few hours of operation and (2) the head of the liquid-solid mixture caused fatigue failure of the open areas of the screen.

SUMMARY OF THE INVENTION

It is one object of the present invention to provide improved types of non-clogging, wear-reducing vibratory screens for a vibratory screening machine which not only have a longer life than prior screens of this type but which also possess an improved arrangement for preventing blinding or clogging.

Another object of the present invention is to provide an improved vibratory screen which can pass subject matter therethrough at a very high rate without early failure compared to previous screens when vibrated under a head of a liquid-solid mixture.

A further object of the present invention is to provide an improved vibratory screening machine which screens matter therethrough at a relatively high rate.

Yet another object of the present invention is to provide an improved vibratory screening machine assembly for screening a product with a virtual assurance that undesirable larger particles will not pass through the machine even if a screen should rupture during the screening process. Other objects and attendant advantages of the present invention will readily be perceived hereafter.

The present invention relates to a vibratory screen for a vibratory screening machine comprising a substantially rigid plate having upper and lower sides and outer edge portions, a plurality of spaced openings extending between said outer edge portions, said spaced openings being relatively small as compared to the size of said plate, border portions on said plate surrounding said openings, a first fine screening screen located proximate said plate, a second fine screening screen located on the opposite side of said first fine screening screen from said plate, said second fine screening screen having smaller openings than said first fine screening screen, a third fine screening screen located on the opposite side of said second fine screening screen from said first fine screening screen, said third fine screening screen having larger openings than said second fine screening screen, said first, second and third fine screening screens extending across said openings, means bonding said first, second and third fine screening screens to said border portions of said plate, and means on said plate for attachment to a vibratory screening machine.

The present invention also relates to a screen assembly for use in a vibratory screening machine having a tank for receiving fluid with particles suspended therein and having means for vibrating the tank and having a fluid inlet to the tank and a fluid outlet to the tank and having means for supplying said fluid to said tank at a rate to maintain a fluid head therein and having mounting means for mounting a vibratory screen in said tank between the inlet and outlet thereof under said head of fluid, the vibratory screen comprising a substantially rigid plate having upper and lower sides and outer edge portions, a plurality of spaced openings extending between said outer edge portions, said spaced openings being relatively small as compared to the size of said plate, border portions on said plate surrounding said openings, a first fine screening screen located proximate said plate, a second fine screening screen located on the opposite side of said first fine screening screen from said plate, said second fine screening screen having smaller openings than said first fine screening screen, a third fine screening screen located on the opposite side of said second fine screening screen from said first fine screening screen, said third fine screening screen having larger openings than said second fine screening screen, said first, second and third fine screening screens extending across said openings, means bonding said first, second and third fine screening screens to said border portions of said plate, and means on said plate for attachment to said mounting means.

The present invention also relates to a vibratory screening machine comprising a tank, means for vibrating said tank, inlet means associated with said tank for conducting a liquid-solid mixture thereto, screen means in said tank, frame means in said tank for mounting said screen means in sealing relationship therewith whereby a head of said liquid-solid mixture may be maintained above said screen means, an outlet for conducting screened material from said tank and trap means operatively associated with said outlet for maintaining a vacuum between said screen means and said outlet.

The various aspects of the present invention will be more fully understood when the following portions of the specification are read in conjunction with the accompanying drawings wherein:

BRIEF DESCRIPTION OF THE DRAWINGS

FIG. 1 is a plan view of one embodiment of the improved vibratory screen of the present invention with portions broken away to show the various layers of the screen;

FIG. 2 is a fragmentary enlarged cross sectional view of the screen plate without the screens thereon taken substantially along line 2—2 of FIG. 1;

FIG. 3 is a greatly enlarged fragmentary cross sectional view taken substantially along line 3—3 of FIG. 1;

FIG. 4 is a greaty enlarged fragmentary cross sectional view taken substantially along line 4—4 of FIG. 1;

FIG. 5 is an greatly enlarged fragmentary cross sectional view taken substantially along line 5—5 of FIG. 1 and showing the relationship among the various screens and showing especially the flats thereon resulting from calendering;

FIG. 6 is an enlarged fragmentary cross sectional view similar to FIG. 5 and schematically showing how the superimposed screens tend to obviate blinding or clogging;

FIG. 7 is a fragmentary plan view taken substantially in the direction of arrows 7—7 of FIG. 6 and showing schematically the relationship between the uppermost screen and the largest particle which can pass therethrough;

FIG. 8 is a fragmentary view taken substantially in the direction of arrows 8—8 of FIG. 5 and showing a flat on one of the wires of the screen which results from calendering;

FIG. 9 is a fragmentary enlarged plan view showing another embodiment of the present invention wherein the unsupported spans of screening are held together at their central locations by a drop of epoxy to thereby further reduce flexing during vibration;

FIG. 10 is a fragmentary cross sectional view taken substantially along line 10—10 of FIG. 9;

FIG. 11 is a fragmentary cross sectional view similar to FIG. 10 but showing a still further embodiment of the present invention wherein the centrally located drops of epoxy are applied to a prior art screen for the same purpose as in FIG. 10;

FIG. 12 is a fragmentary greatly enlarged cross sectional view similar to FIG. 5 but showing superimposed screens which are not calendered;

FIG. 15 is a cross sectional view taken substantially along line 15—15 of FIG. 14 and extending through both of the machines shown in FIG. 13;

FIG. 16 is a fragmentary cross sectional view taken substantially along line 16—16 of FIG. 14 and showing the structure for securing a screen in the machine;

FIG. 17 is an enlarged side elevational view of one section of the machine of FIG. 13;

FIG. 18 is a fragmentary cross sectional view taken substantially along lines 18—18 of FIGS. 14 and 16.

DESCRIPTION OF THE PREFERRED EMBODIMENTS

Figure 13:
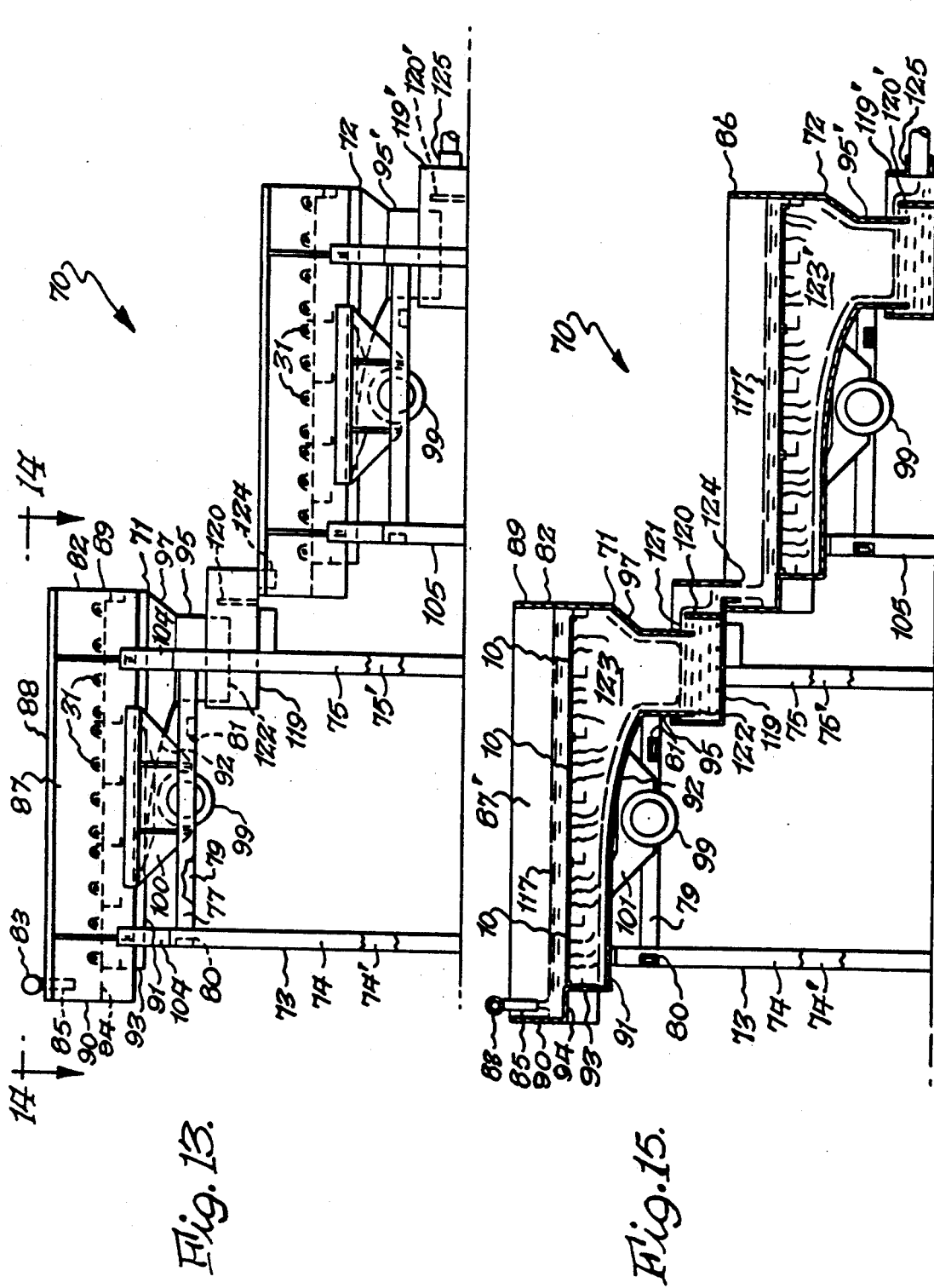
FIG. 13 is a side elevational view of the improved vibratory screening machine of the present invention.
Figure 14:
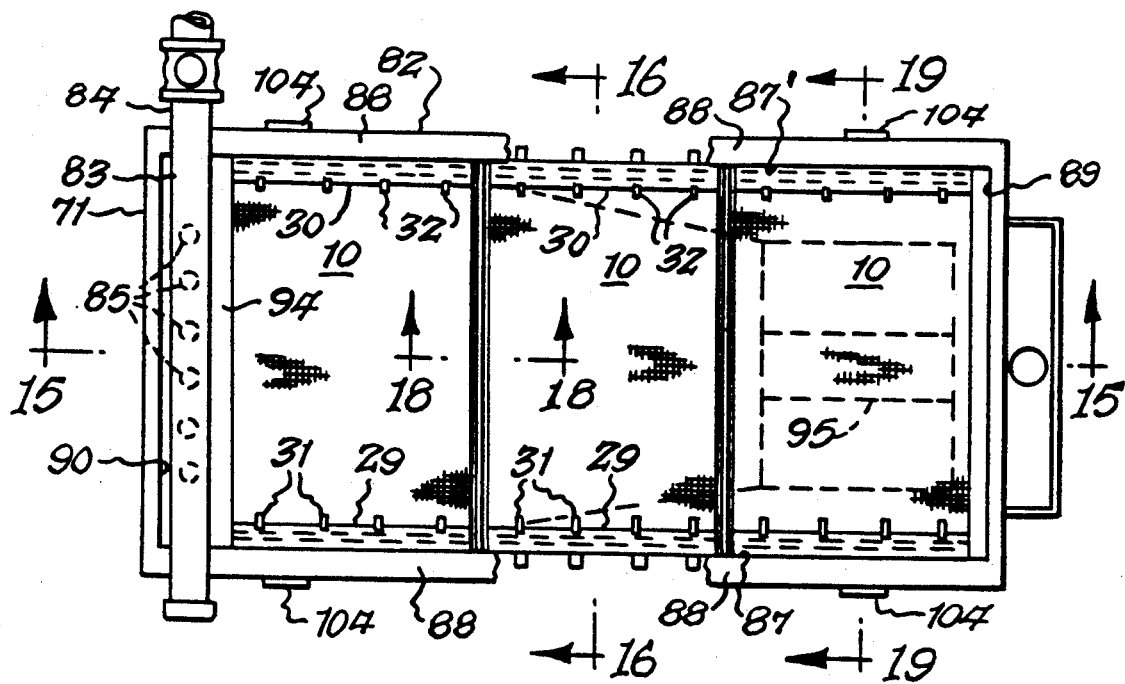
FIG. 14 is a fragmentay plan view taken substantially in the direction of arrows 14—14 of FIG. 13.

One embodiment of the non-clogging wear-reducing improved vibratory screen 10 of the present invention is intended for processing kaolin, but with different screen sizes it is intended to be used for screening pigments, drilling mud and other materials. The foregoing types of screening are intended to be in the 200 micron to 25 micron range (70 mesh to 500 mesh) under fluid heads and high "G" vibrational loads, but the screen 10 can also be used without fluid heads.

Screen 10 includes a perforated metal plate 11, such as steel or any other suitable metal, having a first pair of opposite edges 12 and 13 and a second pair of opposite edges 14 and 15 and an upper surface 16 and a lower surface 17. Plate 11 includes openings or apertures 19 which are bordered by elongated metal strip-like portions 20 which extend from edge 12 to edge 13 and by staggered shorter strip-like portions 21 which extend lengthwise between edges 14 and 15. The openings 19 are formed by a punching operation and are quadrangles of approximately one inch square with rounded corners, but they may be of any other desired shape or size. The dimensions of openings 19 should not be less than about one-half inch or greater than about four inches, and more preferably not greater than about two and one-half inches and most preferably not greater than about one inch. Strip-like portions 20 and 21 are approximately 1/10 inches wide, but they may be of any desired width. The length of plate 11 between edges 12 and 13 may be approximately four feet and its width between edges 14 and 15 may be approximately 3½ feet and it may have a thickness of about 1/16 of an inch. However, it will be appreciated that the size of plate 11 may vary as required to fit different machines. In a plate 11 which is about four feet in length, there will be about 35 openings 19 in each row between edges 12 and 13 when the openings are one inch square, and there will be approximately 24 rows of openings in the plate. Thus, the width of each opening is a small fraction of the length of the plate between edges 12 and 13. The same is true of the relationship between the height of openings 19 and the width of the plate between edges 14 and 15. Channel-shaped members 22 and 23 are formed integrally with plate 11 at edges 12 and 13, respectively, for attaching the screen to a vibratory screening machine, but other forms of attachment can be used.

A coarse supporting screen 24 extends substantially entirely across upper surface 16. Screen 24, which is known as "bolting cloth", in this particular instance is 46 mesh but it may be of any other suitable mesh size. A first fine screening screen 25 extends over the entire coarse screen 24 and is in contiguous abutting relationship therewith. Screen 25 in this particular instance is 120 mesh but it may be of any other suitable mesh. Screen 25 has a wire diameter of 0.0022 inches. A second fine screening screen 26 extends across the entire upper surface of fine screen 25 and is in contiguous abutting relationship therewith. Screen 26 in this particular instance is 370 mesh but it may be of any other suitable mesh. Screen 26 has a wire diameter of 0.001 inches. A third fine screening screen 27 extends across the entire upper surface of screen 26 and is in contiguous abutting relationship therewith. Screen 27 in this particular instance is 120 mesh but it may be of any other suitable mesh. Screen 27 has a wire diameter of 0.0012 inches. It will be appreciated that different sizes of screens 25, 26 and 27 may be utilized for different applications, and as noted above, the screen sizes of the finest screen 26 may be between 70 and 500 mesh, that is, between 200 microns and 25 microns, respectively. Screens 25 and 27 will necessarily be of a larger size than screen 26 in accordance with the principles of the present invention.

Coarse screen 24 is basically a support for the portions of screens 25, 26 and 27 which overlie openings 19. Screens 24, 25, 26 and 27 are secured to the elongated border portions 20 and 21 and to each other and by epoxy adhesive 28. However, other suitable adhesives or methods of bonding may be used. Thus, the borders of the portions of screens 24, 25, 26 and 27 overlying each opening 19 are firmly adhesively secured to the border portions formed by elongated strip-like portions 20 and 21. The border portions 20 and 21 can be seen through the screens when the screen assembly is viewed in plan, as in FIG. 1. However, this has been omitted from the drawings for ease of illustration.

The screen 10 is also an improvement over that of U.S. Pat. No. 4,575,421 in that it has a longer useful life. In this respect, when the prior screen is vibrated up and down under a head of a viscous liquid-solid mixture, the unsupported spans of screening across each aperture 19 tend to flex up and down in a direction perpendicular to the plane of the aperture. This results in fatigue loading and work hardening of the screens at the edges of the apertures, and after a period of operation, there can be a tendency for the screening to rupture at the edges of the apertures. Also, the fragile upper finest screen is subject to the destructive abrasion of relatively large particles. As soon as only one portion of the screen breaks in the foregoing manner, the screen is no longer satisfactory for continued use because it loses its effectiveness.

In contrast to the foregoing, the screen 10 of the present invention does not tend to act in the foregoing manner when used under a head of a viscous liquid-solid mixture. In this respect, the additional fine screen 27 which overlies the finest screen 26 tends to stabilize the unsupported span of screening across each aperture 19, and it is believed that it thus reduces the amount of flexing back and forth so that fatigue stressing at the borders of the apertures is virtually obviated. In addition, the uppermost fine screen 27 prevents the entire load of the material being screened from being exerted on the more fragile intermediate screen 26. The same is true of the screen 25 between coarse screen 24 and finest screen 26. In this respect, screen 25 also protects screen 26 from bearing the total load during screen pulsation in a vertical direction. The reasons screens 25 and 27 provide support for finest screen 26 in this instance is because they have a larger wire diameter. In addition, the uppermost screen 27 protects screen 26 from abrasion by relatively large particles.

As noted above, and as will be described in conjunction with a vibratory screening machine, improved screens of the present invention are intended to be used with a head of a viscous liquid-solid mixture maintained above them during the screening process, which facilitates the passage of material through the screens. However, the prior art screen discussed above could not function for long periods of time under a load created by a pulsating head of a liquid-solid mixture because, as noted above, the uppermost finest screen bore the entire load and thus was susceptible to rupture. A comparative test under substantially identical circumstances under a head of liquid has shown that a screen of the type of U.S. Pat. No. 4,575,421 failed in about five hours whereas a screen 10 of the present invention continued running for thirty hours and was still intact at the end of this period. The screen 10 thus can withstand the pulsating fluid head loads and forces due to large particle abrasion because the large particles cannot exert their entire force against the finest screen 26.

In accordance with another aspect of the present invention, as shown in FIGS. 5, 6 and 8, screens 24, 25 and 27 are calendered to provide flats at their knuckles, that is, where the wires of each screen cross each other. A flat of this type is shown at 45 where wires 47 and 49 of screen 25 cross each other. As noted above, coarse screen 24 is of 46 mesh and it consists of wires 50 and 51 which cross each other. Screen 24 is calendered to provide flats 53 at the knuckles. These flats are of a similar shape to flat 45 shown in FIG. 8. Screen 24, before calendaring, was 0.0090 inches thick, and after calendering it is 0.0074 inches thick. Screen 25, which is 120 mesh, consists of wires 54 and 55 which cross each other. This screen is also calendered to produce flats 57, which are the same as flats 45 shown in FIG. 8. Screen 25, which was originally 0.0044 inches thick, is reduced to 0.0040 inches thick. Fine screen 26, which consists of crossing wires 59 and 60, is not calendered, and it retains its normal thickness of 0.0020 inches. Screen 27 is 120 mesh, and, as noted above, consists of crossing wires 47 and 49. Screen 27 is calendered, and it has flats 45 thereon. Screen 27 was originally, 0.0044 inches thick and the calendering reduced it to 0.0040 inches thick.

As noted above, the calendered screens 24, 25 and 27 have flats 53, 57 and 45, respectively, at their knuckles. These flats provide flat surfaces for contiguous screens to bear on. This is in contrast to a construction wherein the screens bear on the rounded surfaces of contiguous screens. Thus, as can be seen from FIG. 5, flat surfaces of wires 54 of screen 25 bear on flat surfaces 53 of wires 51 of screen 24. In addition, the knuckles of the finest screen 26 bear on flat surfaces 45 of screen 27 and also bear on the flat surfaces 57 of screen 25. In addition, flat surfaces 53 of screen 24 bear on plate 11. Thus, the contacting portions between screens 24 and 25 are where the flats 57 engage flats 53. The contacting portions between screen 26 and screens 25 and 27 are where the rounds of the wires of screens 26 engage the flats of screens 25 and 27. The practical significance of all the foregoing is that there is good bearing contact provided by the flats which distribute the forces encountered during vibration over larger areas than if the rounded portions of the contiguous wires engaged each other, thereby in effect strengthening the screen. This can be more readily visualized when it is considered that without the flats there would probably be point contacts between the contiguous screens which would result in greater stresses placed at the points where the screens contact each other.

Another aspect of the improved screen 10 is that its construction tends to obviate blinding or clogging. This is explained relative to FIGS. 6 and 7. As can be seen from FIG. 7, the largest particle 61 which can pass through uppermost screen 27 is a spherical particle 61 which can pass through the space 62 between crossed wires 47 and 49. This spherical particle is also shown in dotted lines in FIG. 6, and it cannot lodge between screens 27 and 26 because fine screen 26 is so close to the underside of screen 27 so that large particles of this size cannot enter the space between screens 27 and 26. However, since this relationship does exist between screens 26 and 27, a particle 61 can only pass through opening 62 to the extent shown by solid lines in FIG. 6. In this respect, before it can completely pass through opening 62, it must contact the tops of wires 59 and 60 of screen 26, and thus it cannot penetrate opening 62 to the extent where the particle 61 can lodge between screens 26 and 27 so as to establish a clogging relationship therebetween. Smaller particles which can pass through screen 27 but not through screen 26 will not clog the openings of either screen 26 or 27 because they can pass out of openings 61 as easily as they passed into them during screen vibration.

In FIGS. 9 and 10 a further embodiment of the present invention is shown. The screen 10' is identical in all respects to screen 10 of the preceding figures. However, in addition, a drop 65 of epoxy is applied at the center of each span of screening which extends across each aperture 19 of plate 11. This drop binds the layers of screens 25, 26 and 27 to each other, and it may also bind them to coarse screen 24 if the latter has a wire which is located so as to be engaged by drop 65. The drop 65 further stabilizes the unsupported span of screening against flexing in a direction perpendicular to the plane of plate 11 and thus further reduces the tendency for fatigue fractures of the mesh screening at the borders of the apertures 19. It is to be especially noted that the drops of epoxy do not significantly reduce the open area of the screening.

A still further embodiment of the present invention is shown in FIG. 11 wherein the concept of FIGS. 9 and 10 is applied to a screen, such as shown in U.S. Pat. No. 4,575,421, wherein there is an upper fine screen 68 and a lower less fine screen 66 on coarse screen 76. More specifically, a dot of epoxy 65' is applied centrally at each unsupported span across each aperture 19' of the plate to stabilize it against excessive flexing. Thus, while the embodiment of FIG. 11 does not have certain of the advantages discussed above relative to the preceding figures, it does have the advantage of more limited flexing across the openings provided by the drop of epoxy. In the embodiments of FIGS. 9, 10 and 11 drops of bonding agents other than epoxy can be used, if desired, provided they can function in the same manner.

In FIG. 12 a further embodiment of the present invention is disclosed. The screen 10" is identical in all respects to the embodiment of FIGS. 1-8 except that screens 24', 25' and 27', which correspond to screens 24, 25 and 27 of FIG. 5, respectively, are not calendered and therefore do not have the various flat surfaces depicted in FIG. 5. While the embodiment of FIG. 12 does have certain of the above-discussed advantages of FIGS. 1-8, it does not have the additional advantage attributable to the flattened knuckles which are not present in this embodiment.

In FIGS. 13-19 an improved vibratory screening machine 70 for processing kaolin is disclosed. Screening machine 70 includes an upper section 71 and a lower section 72 which are substantially identical to each other except that they are mounted on two different levels. More specifically, machine 71 is mounted on frame 73 consisting of two sets of legs, namely, 74-74' and 75-75'. Legs 74 and 75 are connected by cross member 77 and legs 74'-75' are connected by cross member 79. Legs 74 and 74' are connected by cross member 80 and braces 77 and 79 are connected by cross member 81.

A tank 82 is mounted on frame 73 for receiving a mixture of kaolin and water to be screened from manifold 83 consisting of an inlet conduit 84 having a plurality of nozzles 85 depending downwardly therefrom. Tank 82 includes side walls 87 and 87' and end walls 89 and 90. A bottom wall 91 closes off the entire bottom of the tank 82, and it includes a downwardly sloping portion 92 having one end which terminates at vertical portion 93 which joins horizontal portion 94. The lowermost portion of plate 92 terminates at outlet duct 95. The opposite side of outlet duct 95 is joined to wall 89 by plate 97, which is part of bottom wall 91.

Figure 19:
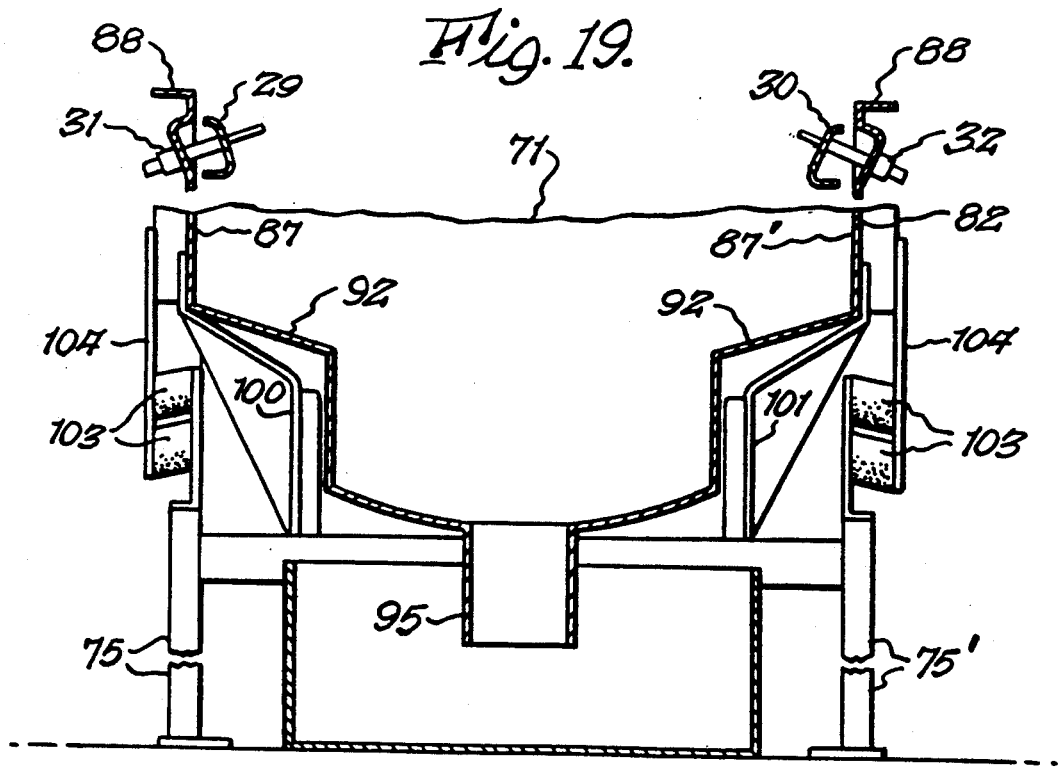
FIG. 19 is a fragmentary cross sectional view taken substantially along line 19—19 of FIG. 14.

A vibrating motor unit 99 is mounted between brackets 100 and 101 which are secured to tank sides 87 and 87' by bolts 102. The upper edges of tank sides 87 and 87' terminate at flanges 88. Tank 82 is mounted on frame 73 by rubber mounting blocks 103 (FIG. 19). More specifically, four legs, such as 104 (FIGS. 13, 14, 17 and 19) have their upper ends secured to sides 87 and 87' of tank 82, as by welding, and their lower ends are suitably secured to first ends of rubber blocks 103 which have their opposite ends secured to the upper ends of legs 74, 74', 75 and 75', as exemplified in FIG. 19. Thus two mounts 103 exist between each of four downwardly depending legs 104 and legs 74, 74', 75 and 75' of the frame. As is well understood, when vibrating motor 99 is energized, tank 82 will be vibrated because it is mounted on rubber mounts 103.

Lower machine section 72 is identical in all respects to upper machine section 71 except that it is mounted on a shorter frame 105 which is identical to frame 73 except that it is shorter. Therefore a detailed description of the parts of frame 105 will be omitted in the interest of brevity.

Three screens 10 of the type described above relative to FIGS. 1-8 or their modifications of FIGS. 9-12 are mounted in each of tanks 82 and 86, which is substantially identical to tank 72. More specifically, tank 82 includes an internal framework consisting of side angles 40 (FIG. 16) which are suitably attached to tank sides 87 and 87'. Cross members 107 (FIG. 17), in the nature of angles, extend between side walls 87 and 87' of the tank 82. In addition, cross members 109, in the nature of angles, also extend between side walls 87 and 87'. Flat plates 110 (FIG. 18) are welded across the tops of angles 109. Polyurethane seal beds 111 extend lengthwise across plates 110 (FIG. 18). The tops of seal beds 111 have a sawtooth pattern 112. Neoprene foam seal gaskets 113 (FIG. 18) are bonded along undersurface 17 of each screen 10 along longitudinal edges 14 and 15. Gaskets 113 have zig-zag edges 114 for mating engagement with zig-zag edges 112. Thus, a seal is provided between the longitudinal edges 14 and 15 of each screen 10 and plates 110. In addition, neoprene sealing strips 114 (FIG. 16) of rectangular cross section are bonded to the underside 17 of each plate 10 along edges 12 and 13. Sealing strips 115, which are rectangular in cross section, are bonded to horizontal legs of frame angles 40. The sealing strips 114 and 113 on the underside of each screen 10 form a continuous perimeter so that there is a complete seal between the underside of each screen 10 and the framework on the inside of tank 82.

Screen assembly 10 is mounted in a vibrating screening machine by means of elongated channel-shaped draw bars 29 and 30 which engage channels 22 and 23, as shown in FIG. 16, and they are drawn up by means of nut and bolt assemblies 31 and 32, respectively, as is well known in the art. Screen assembly 10 is supported on the frame within tank 82 on seals 111 and 115, as noted above. A plurality of elongated members 33 extend parallel to frame members 40 and 41 and they are supported at their opposite ends on the frame members 109. They are also supported intermediate their ends by frame members 107. As noted above, seals 114 on edges 12 and 13 of screen 10 bear on seals 115 supported on frame portions 40 and 41. Seals 113 on edges 14 and 15 of screen 10 rest on seals 111 supported by spaced frame portions 109. In its operative position screen assemblies 10 may be bowed slightly so that their centers along a line parallel to edges 12 and 13 is higher than the outer edges 12 and 13, as is well known. It will be appreciated that screens 10 may be mounted in any other suitable sealed relationship within tanks 82 so that material deposited on the tops of screens 10 must pass through them and cannot bypass them.

As noted briefly above, the specific vibratory screening machine and the screens 10 were designed specifically for the screening of a kaolin-water mixture. However, as noted hereafter, the screens 10 may be used in other applications, such as screening oil drilling mud or other substances in different types of machines, such as disclosed in U.S. Pat. No. 4,882,054.

In operation, the kaolin-water mixture to be screened is supplied by inlet manifold 83. It flows through discharge nozzles 85 onto plate 94 within the tank 82. The rate of flow is such that a head of preferably between 3 and 6 inches to a level of 117 (FIG. 15) is maintained in upper tank 82, and the same head 117' is maintained in lower tank 86. As the tank 71 is vibrated by motor 99, the mixture of kaolin and water will be forced through the three screens 10 and it will pass through outlet duct 95 into trap 119 which essentially is a tank with a partition 120 therein so that the latter acts in the nature of a weir so that the fluid level 121 is maintained above the level of outlet end 122 of outlet duct 95. In view of the head maintained at 117 and in view of the operation of trap 119, air cannot enter chamber 123 and there is a tendency to form a slight vacuum therein. Chamber 123 is located between the underside of screens 10 and the bottom 92 of the tank. The outlet 124 of trap 119 empties into lower tank 86 where, as noted above, a head 117' is maintained. The material passing out of outlet 95' of tank 86 enters liquid trap 119' having a weir 120' therein. Trap 119' coacts with tank 86 in the same manner as does trap 119 with tank 82, namely, to prevent air from entering the chamber 123'. A slight vacuum is thus produced underneath screen assemblies 10 in tank 86 to aid in the screening process. The flow of material leaves trap 119' through outlet 125. While the slight vacuum produced by the operation of traps 119 and 119' aids the screening process, the screening process can operate satisfactorily without such traps but at a slower rate.

The utility of the use of a machine, such as shown in FIG. 13, where two screening machines are utilized sequentially, is that in the event that one of the screens of either one of the vibratory screening machines 71 or 72 should fail, there will still be no passage of particles from the outlet of machine 72 which is greater than the maximum size of particle which can pass through and attack screen assembly 10.

Screens 10 are also intended for use in vibratory screening machines of the type disclosed in U.S. Pat. No. 4,882,054. In such use, the bed of the machine is tilted upwardly so that a head of a drilling mud and water mixture is maintained above the screen. The trailings, that is, material which will not pass through the screen, will pass off of the end of the screen while the drilling mud will pass through the screen. In a machine, such as shown in U.S. Pat. No. 4,882,054, a vacuum is not utilized beneath the screen. In this type of machine, the screen which was used had different parameters than described above. A slotted 325 mesh screen was used as the finest screen and it corresponded to screen 26 of FIG. 1. In this screen, the space between wires in one direction was 325 mesh, and the slots were elongated to approximately 2½ times the 325 mesh distance. The screens corresponding to screens 25 and 27 of FIG. 1 could be 88 mesh or 105 mesh or 120 mesh or any other size depending on the application to which the screens were put. In an actual test, a screen of the type shown in U.S. Pat. No. 4,575,421 having a double screen with mesh sizes of 180 and 220 lasted between 16 to 18 hours whereas a 325 mesh screen wherein the finest screen was 325 mesh and the screens on opposite sides thereof were 120 mesh and which were fabricated in accordance with the present invention lasted 130 hours in operation.

It will be appreciated that the screen assemblies of the present invention are not limited to the specific sizes of the various screens which were described above by way of example and not of limitation. The basic theory is intended to be applied to various types of screening applications and this basic theory in its broadest sense utilizes two fine screens on opposite sides of a finer screen with the three screens being bonded to a perforated plate.

While preferred embodiments of the present invention have been disclosed, it will be appreciated that it is not limited thereto but may be otherwise embodied within the scope of the following claims.

What is claimed is:

1. A vibratory screen for a vibratory screening machine comprising a substantially rigid plate having upper and lower sides and outer edge portions, a plurality of spaced openings extending between said outer edge portions, said spaced openings being relatively small as compared to the size of said plate, border portions on said plate surrounding said openings, a first fine screening screen located proximate said plate, a second fine screening screen located on the opposite side of said first fine screening screen from said plate, said second fine screening screen having smaller openings than said first fine screening screen, a third fine screening screen located on the opposite side of said second fine screening screen from said first fine screening screen, said third fine screening screen having larger openings than said second fine screening screen, said first, second and third fine screening screens extending across said openings, means bonding said first, second and third fine screening screens to said border portions of said plate, said first and third fine screening screens being of the type capable of providing a fine screening function and both providing a support function to said second fine screening screen between said border portions during vibration of said vibratory screen, and means on said plate for attachment to a vibratory screening machine.

2. A vibratory screen for a vibratory screening machine as set forth in claim 1 wherein said second fine screening screen has a mesh size of between about 70 and 500 mesh.

3. A vibratory screen for a vibratory screening machine as set forth in claim 1 wherein said first and third fine screening screens have wires of a larger diameter than the wires of said second fine screening screen.

4. A vibratory screen for a vibratory screening machine as set forth in claim 3 wherein said third screening screen is of a size of about 120 mesh.

5. A vibratory screen for a vibratory screening machine as set forth in claim 1 including a coarse screen located between said first fine screening screen and said plate.

6. A vibratory screen for a vibratory screening machine as set forth in claim 5 wherein said first and third fine screening screens have wires of a larger diameter than the wires of said second fine screening screen.

7. A vibratory screen as set forth in claim 5 wherein said first and third screens can be as large as 88 mesh and wherein said second screen can be as small as 500 mesh.

8. A vibratory screen as set forth in claim 5, wherein said second screen is of 370 mesh, and wherein said first and third screens are of 120 mesh.

9. A vibratory screen as set forth in claim 5 wherein said second screen is of 325 mesh, and wherein said first and third screens are of 120 mesh.

10. A vibratory screen as set forth in claim 5 wherein said second screen can be as small as 370 mesh, and wherein said first and third screens can be as large as 88 mesh.

11. A vibratory screen as set forth in claim 5 wherein said second screen is of 325 mesh, and wherein said first and third screens are between 88 and 120 mesh.

12. A vibratory screen for a vibratory screening machine as set forth in claim 1 wherein said first and third fine screening screens have knuckles at the crossover points of the wires thereof, and wherein said first and third screens are calendered to provide flat surfaces at the knuckles thereof, and wherein said second screen is held between said flat surfaces.

13. A vibratory screen for a vibratory screening machine as set forth in claim 12, wherein said first and third fine screening screens have wires of a larger diameter than the wires of said second fine screening screen.

14. A vibratory screen assembly for a vibratory screening machine as set forth in claim 13 wherein said second fine screening screen has a mesh size of between about 70 to 500 mesh.

15. A vibratory screen for a vibratory screening machine as set forth in claim 12 including a coarse screen located between said first fine screening screen and said plate.

16. A vibratory screen for a vibratory screening machine as set forth in claim 15 wherein said first and third fine screening screens have wires of a larger diameter than the wires of said second fine screening screen.

17. A vibratory screen for a vibratory screening machine as set forth in claim 1 wherein said first and third fine screening screens are of substantially the same size.

18. A vibratory screen for a vibratory screening machine as set forth in claim 1 wherein said third screening screen is of a size of about 120 mesh.

19. A vibratory screen as set forth in claim 1 wherein said first and third screens can be as large as 88 mesh and wherein said second screen can be as small as 500 mesh.

20. A vibratory screen as set forth in claim 1 wherein said second screen is of 370 mesh, and wherein said first and third screens are of 120 mesh.

21. A vibratory screen as set forth in claim 1 wherein said second screen is of 325 mesh, and wherein said first and third screens are of 120 mesh.

22. A vibratory screen as set forth in claim 1 wherein said second screen can be as small as 370 mesh, and wherein said first and third screens can be as large as 88 mesh.

23. A vibratory screen as set forth in claim 1 wherein said second screen is of 325 mesh, and wherein said first and third screens are between 88 and 120 mesh.

24. A vibratory screen as set forth in claim 1 wherein said first and third fine screening screens have knuckles at the crossover points of the wires thereof, and wherein at least one of said first and third screens is calendered to provide flat surfaces at the knuckles thereof for providing bearing areas for said second screen.

25. A vibratory screen as set forth in claim 24 wherein said first and third fine screening screens have wires of larger diameter than the wires of said second fine screening screen.

26. A vibratory screen as set forth in claim 24 wherein said first and third screens can be as large as 88 mesh and wherein said second screen can be as small as 500 mesh.

27. A vibratory screen as set forth in claim 24 wherein said second screen is of 370 mesh, and wherein said first and third screens are of 120 mesh.

28. A vibratory screen as set forth in claim 24 wherein said second screen is of 325 mesh, and wherein said first and third screens are of 120 mesh.

29. A vibratory screen as set forth in claim 24 wherein said second screen can be as small as 370 mesh, and wherein said first and third screens can be as large as 88 mesh.

30. A vibratory screen as set forth in claim 24 wherein said second screen is of 325 mesh, and wherein said first and third screens are between 88 and 120 mesh.

31. In a vibratory screening machine having a tank for receiving fluid with particles suspended therein and having means for vibrating the tank and having a fluid inlet to the tank and having a fluid outlet to the tank and having means for supplying said fluid to said tank at a rate to maintain a fluid head therein and having mounting means for mounting a vibratory screen in said tank between the inlet and outlet thereof under said head of fluid, the vibratory screen comprising a substantially rigid plate having upper and lower sides and outer edge portions, a plurality of spaced openings extending between said outer edge portions, said spaced openings being relatively small as compared to the size of said plate, border portions on said plate surrounding said openings, a first fine screening screen located proximate said plate, a second fine screening screen located on the opposite side of said first fine screening screen from said plate, said fine second screening screen having smaller openings than said first fine screening screen, a third fine screening screen located on the opposite side of said second fine screening screen from said first fine screening screen, said third fine screening screen having larger openings than said second fine screening screen, said first, second and third fine screening screens extending across said openings, means bonding said first, second and third fine screening screens to said border portions of said plate, said first and third fine screening screens being of the type capable of providing a fine screening function and both providing a support function to said second fine screening screen between said border portions during vibration of said vibratory screen, and means on said plate for attachment to said mounting means.

32. A vibratory screen for a vibratory screening machine comprising a substantially rigid plate, a plurality of spaced plate openings in said plate, said spaced plate openings being relatively small as compared to the size of said plate, upper and lower fine screening screens bonded to said plate and extending across said plate openings with said lower fine screen being located between said upper fine screen and said plate, first line screen openings in said upper fine screen for passing first particles of a first maximum diameter, and second fine screen openings in said lower fine screen for passing second particles of a second maximum diameter which is less than said first maximum diameter, the spacing between said upper and lower fine screens being such that said lower fine screen will engage said first particles of said first maximum diameter before said first particles can pass into said first fine screen openings to an extent that they can become lodged between said upper and lower fine screens, said lower fine screen having wires of a first diameter and said upper fine screen having wires of a second diameter which is larger than said wires of said first diameter to thereby reinforce said wires of said first diameter while not effectively impeding particles of said second maximum diameter from passing through said lower fine screen, a third fine screen between said lower fine screen and said plate for reinforcing said lower fine screen, said third fine screen having third screen openings of greater size than said second screen openings, and said first and third fine screening screens being of the type capable of providing a fine screening function and both providing a support function to said second fine screening screen between said border portions during vibration of said vibratory screen.

33. A vibratory screen for a vibratory screening machine comprising a substantially rigid plate, a plurality of spaced plate openings in said plate, said spaced plate openings being relatively small as compared to the size of said plate, border portions on said plate surrounding said openings, a first fine screening screen located proximate said plate, a second fine screening screen located on the opposite side of said first fine screening screen from said plate, said first and second fine screening screens extending across said openings, means bonding said first and second fine screening screens to said border portions of sad plate, and bonding means bonding said first and second fine screening screens to each other at central portions of said openings.

34. A vibratory screen for a vibratory screening machine as set forth in claim 33 including a third fine screening screen on the opposite side of said second fine screening screen from said first fine screening screen, and wherein said bonding means also bonds said third fine screening screen to said first and second fine screening screens at said central portions of said openings.

35. A vibratory screen for a vibratory screening machine as set forth in claim 34 wherein said second fine screening screen has smaller openings than said first and third fine screening screens.

36. A vibratory screen for a vibratory screening machine as set forth in claim 33 wherein said second fine screening screen has smaller openings than said first fine screening screen.

37. A vibratory screening machine assembly comprising first and second machine sections each having first and second tanks, respectively, means for vibrating said first and second tanks, inlet means associated with said first tank for conducting a liquid-solid mixture thereto, first and second screen means in said first and second tanks, respectively, frame means in said first and second tanks for mounting said screen means in sealing relationship with said first and second tanks, respectively, whereby a head of said liquid-solid mixture may be maintained above said first and second screen means, first and second outlets for conducting screened material from said first and second tanks, respectively, first trap means operatively associated with said first outlet for maintaining a vacuum between said first screen means and said first outlet, and second trap means operatively associated with said second outlet for maintaining a vacuum between said second screen means and said second outlet.

38. A vibratory screening machine assembly as set forth in claim 37 wherein said first and second screen means each comprise a substantially rigid plate having upper and lower sides and outer edge portions, a plurality of spaced openings extending between said outer edge portions, said spaced openings being relatively small as compared to the size of said plate, border portions on said plate surrounding said openings, a first fine screening screen located proximate said plate, a second fine screening screen located on the opposite side of said first fine screening screen from said plate, said second fine screening screen having smaller openings than said first fine screening screen, a third fine screening screen located on the opposite side of said second fine screening screen from said first fine screening screen, said third fine screening screen having larger openings than said second fine screening screen, said first, second and third fine screening screens extending across said openings, means bonding said first, second and third fine screening screens to said border portions of said plate, and means on said plate for attachment to a vibratory screening machine.

39. A vibratory screening machine comprising a tank, means for vibrating said tank, inlet means associated with said tank for conducting a liquid-solid mixture thereto, screen means in said tank, frame means in said tank for mounting said screen means in sealing relationship therewith whereby a head of said liquid-solid mixture may be maintained above said screen means, an outlet for conducting screened material from said tank and trap means operatively associated with said outlet for maintaining a vacuum between said screen means and said outlet, said screen means comprising a substantially rigid plate having upper and lower sides and outer edge portions, a plurality of spaced openings extending between said outer edge portions, said spaced openings being relatively small as compared to the size of said plate, border portions on said plate surrounding said openings, a first fine screening screen located proximate said plate, a second fine screening screen located on the opposite side of sad first fine screening screen from said plate, said second fine screening screen having smaller openings than said first fine screening screen, a third fine screening screen located on the opposite side of sad second fine screening screen from said first fine screening screen, said third fine screening screen having larger openings than said second fine screening screen, said first, second and third fine screening screens extending across said openings, means bonding said first, second and third fine screening screens to said border portions of sad plate, and means on said plate for attachment to said vibratory screening machine.

40. A vibratory screen for a vibratory screening machine comprising a substantially rigid plate having upper and lower sides and outer edge portions, a plurality of spaced openings extending between said outer edge portions, said spaced openings being relatively small as compared to the size of said plate, border portions on said plate surrounding sad openings, a first fine screening screen located proximate said plate, a second fine screening screen located on the opposite side of said first fine screening screen from said plate, said second fine screening screen having smaller openings than said first fine screening screen, a third fine screening screen located on the opposite side of said second fine screening screen from said first fine screening screen, said third fine screening screen having larger openings than said second fine screening screen, said first, second and third fine screening screens extending across aid openings, means bonding said first, second and third fine screening screens to said border portions of said plate, means on said plate for attachment to a vibratory screening machine, said first and third fine screening screens having knuckles at the crossover points of the wires thereof, said first and third screens being calendered to provide flat surfaces at the knuckles thereof, said second screen being held between said flat surfaces, a coarse screen located between said first fine screening screen and said plate, and said coarse screen being calendered to provide second flat surfaces for supporting said first tine screening screen.

* * * * *

UNITED STATES PATENT AND TRADEMARK OFFICE
CERTIFICATE OF CORRECTION

PATENT NO. : 5,221,008
DATED : June 22, 1993
INVENTOR(S) : H. William Derrick, Jr. and John J. Bakula It is certified that error appears in the above-identified patent and that said Letters Patent is hereby corrected as shown below:

Column 11, line 66 (claim 14), change "to" to --and--.
Column 13, line 68 (claim 33), change "sad" to --said--.
Column 15, line 9 (claim 39), change "sad" to --said--;
          line 12 (claim 39), change "sad" to --said--;
          line 19 (claim 39), change "sad" to --said--.
Column 16, line 2 (claim 40), change "sad" to --said--;
          line 12 (claim 40), change "aid" to --said--.

Signed and Sealed this

Eighth Day of February, 1994

Attest:

BRUCE LEHMAN

*Attesting Officer*     Commissioner of Patents and Trademarks